O. F. LAWSON.
VEHICLE SEAT.
APPLICATION FILED OCT. 11, 1912.
1,063,809.
Patented June 3, 1913.
2 SHEETS—SHEET 1.
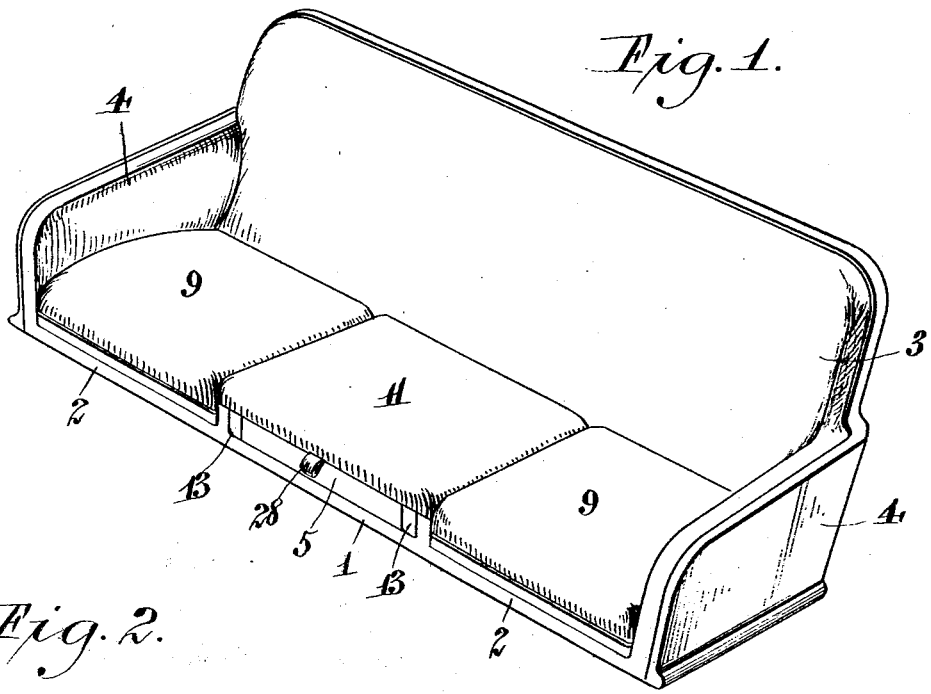
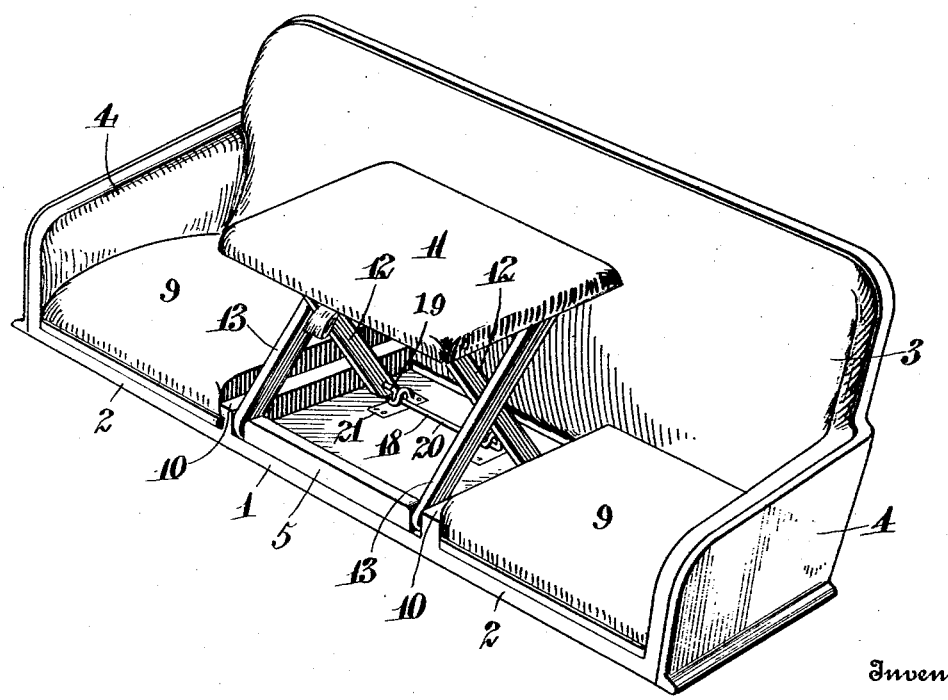
Witnesses:
Christ Heinle Jr.
Dudley B. Howard
Inventor,
Olof F. Lawson.
By Victor J. Evans,
Attorney.

O. F. LAWSON.
VEHICLE SEAT.
APPLICATION FILED OCT. 11, 1912.
1,063,809.
Patented June 3, 1913.
2 SHEETS—SHEET 2.
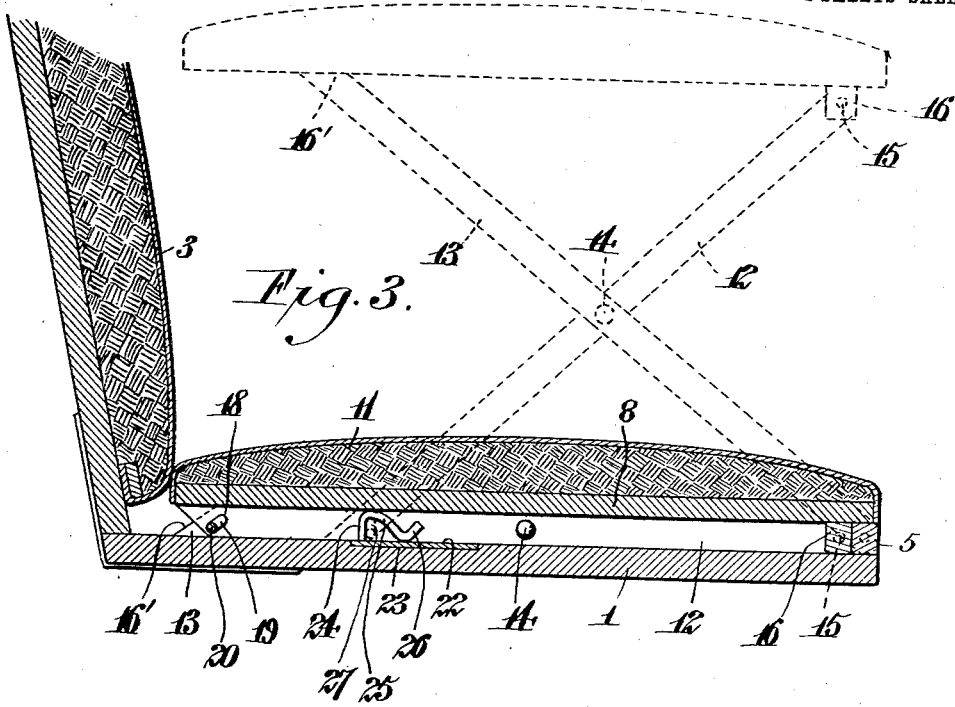
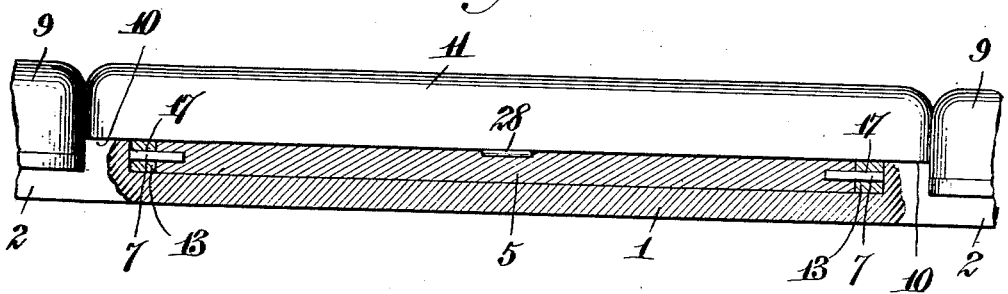
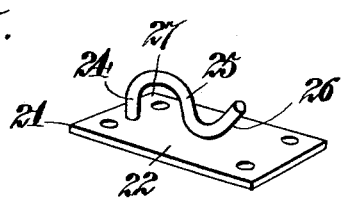
Witnesses:
Christ Feinle, Jr.
Dudley B. Howard
Inventor,
Olof F. Lawson.
By Victor J. Evans,
Attorney.

UNITED STATES PATENT OFFICE.

OLOF F. LAWSON, OF NEW SHARON, IOWA.

VEHICLE-SEAT.

1,063,809. Specification of Letters Patent. Patented June 3, 1913.

Application filed October 11, 1912. Serial No. 725,237.

*To all whom it may concern:*

Be it known that I, OLOF F. LAWSON, a citizen of the United States, residing at New Sharon, in the county of Mahaska and State of Iowa, have invented new and useful Improvements in Vehicle-Seats, of which the following is a specification.

This invention relates to supplemental seats for vehicles; and has for an object to provide a supplemental seat which may form a permanent part of the ordinary seat of the vehicle and which may be readily adjusted whereby to comfortably accommodate a third person.

Another object of the invention is to provide a supplemental seat which may be adjusted to a position when not in use whereby it will occupy the same general plane with adjacent portions of the main seat.

In the accompanying drawings: Figure 1 is a perspective view of the seat, showing the supplemental seat unfolded; Fig. 2 is a similar view, showing the supplemental seat, folded; Fig. 3 is a transverse section through the main seat and through the supplemental seat; and Fig. 4 is a longitudinal section through a portion of the main seat, showing the hinged support for the supplemental seat. Fig. 5 is a perspective view of one of the keeper plates.

I contemplate constructing a main vehicle seat of a flat horizontally disposed body member 1, which is provided with spaced raised portions 2, a back rest 3 and side rails or arms 4. The main body member is provided adjacent its forward edge and preferably midway between its ends and immediately between the portions 2 with a cleat 5 whose ends are provided with pintles 7 for a purpose to be hereinafter described. The outer extremities of the pintles are in mutual engagement with the adjacent sides of the companion portions 2 of the main seat.

The supplemental third seat comprises a seat forming member 8, which is adapted to occupy the space between the opposing inner sides of the cushions 9 on the portions 2 of the main seat and to rest onto the side extensions 10 of said portions 2 when the supplemental seat is in a closed or folded position. At this time, the cushion 11 of the supplemental seat lies in the same general plane with the cushions 9. Supporting members at each side of the supplemental seat include companion cross bars 12 and 13, which are pivotally connected together at 14 whereby they may be folded to lie one immediately beside the other when the seat is folded. The bars 12 of said supports are pivoted at 15 to the end of a cleat 16 beneath the main seat forming element. The upper extremities of the bars 13 are beveled to form horizontal seat rests 16', which are adapted to lie in flat contact with the under sides of the supplemental seat when the latter is extended for use. The lower ends of the bars 13 are apertured, as at 17, to receive the hinged pintles 7 of the cleat 5 on the main seat forming member, whereby the supplemental seat may be conveniently drawn upwardly and outwardly to an unfolded position. The side bars 12 of the supplemental seat supports are connected together by a brace rod 18. This rod is provided with offset portions 19, whereby the immediate keeper engaging portions 20 of the bar is adapted to slide directly across the main seat forming member 1 at a point between the portions 2 of said member.

Keeper plates 21 are secured in the main seat forming member 1 and disposed so as to lie directly in the path of adjustment of the keeper engaging portion 20 of the connecting cross bar 18. Said keeper plates are preferably provided with portions 22, which are countersunk, as at 33, in the main seat forming member 1 and, as shown, said plates are provided at their rear ends with vertically extending portions 24 which terminate in forwardly extending tongues 25 and guiding portions 26. From this construction spaces 27 are defined by the hooks 25 and adjacent portions of the plate 22 whereby to receive said intermediate portion 27 of the brace rod 18. The guide portions 26 of the hook are disposed at an angle with relation to the portion 22, so as to facilitate the entrance of the portion 20 in said spaces 27.

From this construction, it is evident that when the portion 20 of the brace rod is engaged with the hooks of the keeper plate, the supplemental seat will be positively held in an operative extended or set-up position, so as to sustain the weight of a person. A tab 28 is secured to the under side of the auxiliary seat and arranged thereon so as to protrude from the forward edge of the seat and to extend over the cleat 5 of the main seat where it may be readily grasped by the hand of the operator in the act of adjusting the supplemental seat to folded or unfolded position.

Having thus described my invention, what I claim is:—

1. A device of the character described provided with permanent seat sections including a base member, a supplemental seat adjustable whereby to lie at one time above the plane of the permanent seat sections and at another time to lie in the same general plane therewith, companion inner and outer pairs of legs supporting the supplemental seat from the main body member, a bar connecting the inner legs together, and means carried by the main body member and including portions defining retaining spaces for the bar, so as to hold the supplemental seat extended, certain of said portions being yieldable whereby to permit the bar to be withdrawn from the spaces when it is desired to fold the supplemental seat between the main seat sections.

2. A main seat having spaced cushion supporting portions, a cleat secured to the main seat and terminally spaced from the adjacent edge of the cushion supporting portions thereof and provided with pintles terminally lying in initial contact with the adjacent sides of said portions, a folding seat adjustable between the spaced portions and having portions pivotally connected with said pintles, and means for holding the folded seat in an adjusted position.

In testimony whereof I affix my signature in presence of two witnesses.

OLOF F. LAWSON.

Witnesses:
E. V. MITCHELTREE,
GROVER C. BAKER.